April 20, 1965 G. B. STILLWAGON, JR 3,178,908
PINNING CONSTRUCTION FOR UNIVERSAL JOINTS
Filed April 23, 1963
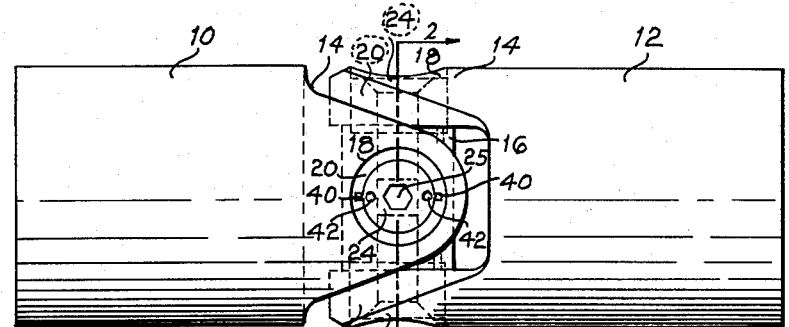
FIG. 1
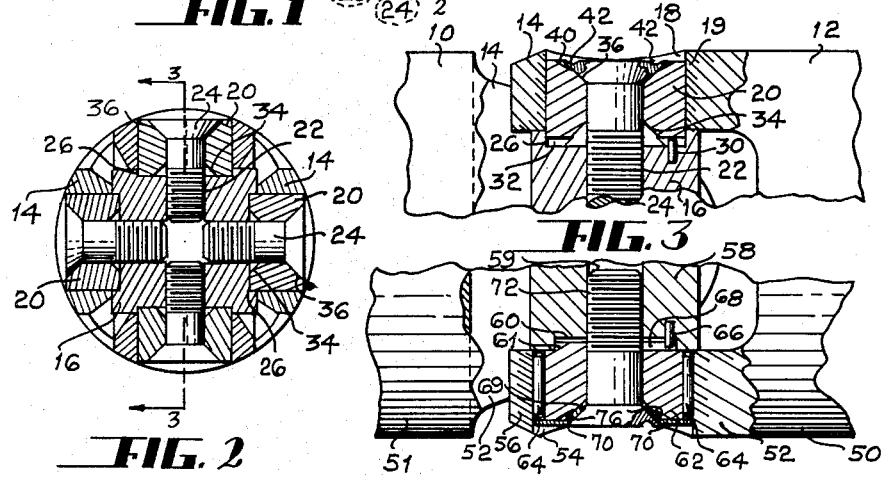
FIG. 2  FIG. 3  FIG. 4
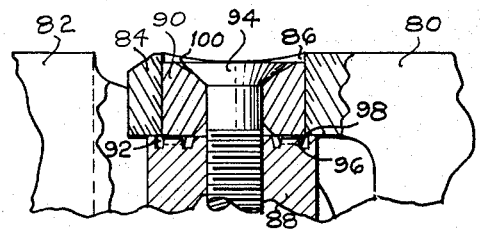
FIG. 5
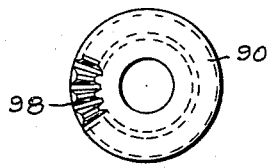
FIG. 7
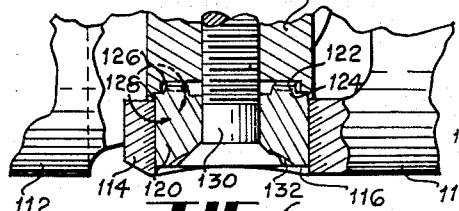
FIG. 6  FIG. 8  FIG. 9
INVENTOR.
GEORGE B. STILLWAGON, JR.
BY 
HIS ATTORNEYS United States Patent Office 3,178,908
Patented Apr. 20, 1965

3,178,908
PINNING CONSTRUCTION FOR
UNIVERSAL JOINTS
George B. Stillwagon, Jr., Dayton, Ohio, assignor of one-half to Kenneth G. Fraser, Dayton, Ohio
Filed Apr. 23, 1963, Ser. No. 275,058
9 Claims. (Cl. 64—17)

This invention relates to a pinning construction for universal joints and more particularly to an improved means for securing pivot pins to a bearing block used in joining the coupling members of the universal joint, however, the invention is not necessarily so limited.

In universal joint constructions wherein opposed coupling members are joined pivotally to an intermediate bearing block, the principal limitations in torque transmitting capacity and in operating life spring from the pivot pin construction and especially the means by which the pivot pins are anchored to the bearing block. For optimum physical characteristics, the jaws of coupling members which pivot on the pivot pins should be in close proximity to the faces of the bearing block. To allow for such construction, however, it is necessary that the pivot pins which project outwardly from the faces of the bearing block be attached to the bearing block after the jaws of the coupling members have been positioned on the bearing block. Thus, a means for attaching the pivot pins to the bearing block after positioning of the bearing block between the jaws of the coupling members is required and, in the final analysis, the structural limitations on the universal joint reside in the effectiveness of the means for attaching the pivot pins to the bearing block.

An object of the present invention is to provide a new and improved means for attaching pivot pins to bearing blocks of universal joints.

Another object of the present invention is to provide an improved universal joint construction which results in improved structural strength and wear properties.

Still another object of the present invention is to provide a new and improved method for assembling universal joints.

Other objects and advantages reside in the construction of parts, the combination thereof, the method of manufacture and the mode of operation, as will become more apparent from the following description.

In the drawing, FIGURE 1 is a plan view of the universal joint equipped with the present invention.

FIGURE 2 is a sectional view, taken substantially along the line 2—2 of FIGURE 1.

FIGURE 3 is an enlarged, fragmentary, elevational view of the universal joint of FIGURES 1 and 2, with a portion shown in section, the section being taken along the line 3—3 of FIGURE 2.

FIGURE 4 is an enlarged, fragmentary, elevational view with a portion shown in section analogous to FIGURE 3 and illustrating a first modification.

FIGURE 5 is an enlarged, fragmentary, elevational view with a portion shown in section, analogous to FIGURE 3 and illustrating a second modification.

FIGURE 6 is an enlarged, fragmentary, elevational view with a portion shown in section, analogous to FIGURE 3 and illustrating a third modification.

FIGURE 7 is an end elevational view of a pivot pin employed in the second modification of FIGURE 5.

FIGURE 8 is an enlarged, fragmentary, detail view of the portion bounded approximately by the line 8 in FIGURE 6.

FIGURE 9 is a fragmentary sectional view illustrating a fourth modification.

Referring to the drawing in greater detail, the universal joint of FIGURE 1 comprises a pair of opposed coupling members 10 and 12, each of which is provided with laterally spaced jaws 14 at one end thereof. The pairs of jaws are adapted to snugly receive a bearing block 16. As illustrated, opposite sides of the bearing block 16 are received between one pair of spaced jaws 14 of one coupling member and the intermediate sides of the bearing block are received between the spaced jaws 14 of the other coupling member.

For attaching the jaws 14 to the various sides of the bearing block, each of the jaws 14 is provided with an aperture 18 therein adapted to receive a tubular pivot pin 20, there being one pivot pin for each of the jaws 14. The walls of the apertures 18 are preferably case hardened, as illustrated by the hatching at 19 in FIGURE 3.

For attaching the pivot pins 20 to the faces of the bearing block 16, each of four faces surrounding the bearing block is provided with a central threaded aperture 22, adapted to receive a threaded stud or screw 24 passing through the tubular pivot pin 20. The several pivot pins 20 are anchored against translational movement on the respective faces of the bearing block 16 by means of shallow cylindrical recesses 26 formed in the faces of the bearing block. These recesses 26 are concentric to the threaded apertures 22 in the bearing block and are dimensioned to receive the pivot pins 20 with a snug fit.

The pivot pins 20 are also each secured against rotational movement relative to the bearing block 16 by providing, in the inner end of each, a diametric slot which is adapted to receive a post 30 projecting outwardly from the base of each recess 26 near the outer margin thereof.

In the preferred embodiment, the threaded studs 24, which are used to fasten the pivot pins 20 to their respective sides of the bearing block 16, are in the form of flat headed hardened steel screws, wherein the flat head of each has a beveled periphery and is provided with a centrally located hexagonal socket 25 for applying a torque to the stud. For receipt of these threaded studs 24, each of the pivot pins 20 is countersunk in its outer end, as indicated at 36. In addition, diametrically disposed radially extending slots 40 are provided in the outer end of each pivot pin 20. For convenience, the two slots in each pivot pin may be formed simultaneously by a rotary cutting tool and, as a result, will have arcuate bottom surfaces, as illustrated in FIGURE 3.

In assembly, the threaded studs 24 are advanced by rotation into the bearing block 16 to a predetermined torque level and, when this torque level has been reached, diametrically disposed marginal portions of the flat head are staked, as illustrated at 42, to displace metal from the flat head into the slots 40 of the pivot pin. This interference fit established between the head of the stud 24 and the outer end of the pivot pin 20, acting in cooperation with the post 30 in the bearing block 16, prevents any counter rotation of the stud 24, such as would relieve the prestressed condition established therein. The amount of torque applied to the studs 24 is calculated to stress the studs to a point just under the yield strength of the stud. Even though the stud is hardened steel, an axial stress of this magnitude slightly expands the stud lengthwise, creating a substantial restoring force drawing the pivot pin against the bearing block 16.

In the preferred embodiment, each of the pivot pins 20, in addition to being countersunk in the outer end thereof, is also countersunk in the inner end thereof, as illustrated at 34. The countersink 34 has the effect of moving the area of contact between the pivot pin 20 in the bearing block 16 radially away from the axis of the stud 24. This assures that the pivot pin 20 will bottom against the base of the recess 26 in a position of stable equilibrium, even though, due to manufacturing tolerances, the bases of the recesses 26 might be slightly convex.

There are a number of features in the above described construction which are worthy of special note. The use of a prestressed stud to anchor the pivot pin 20 enables fabrication of the universal joint with a minimum of metal removed from the bearing block 16. Specifically, only enough metal is removed to provide a threaded bore for receiving the stud and to provide a shallow recess and resultant retaining wall for anchoring the pivot pin against translational movement. Since the retaining wall will not be subjected to appreciable lateral forces, it may be quite thin, as illustrated, and correspondingly, the diameter of the pivot pin 20 may be quite large in relation to the dimensions of the bearing block 16. In short, the present construction permits the use of pivot pins of exceptionally large diameter, with the beneficial result that the contact pressure between the periphery of the pivot pin and the wall of the aperture 18 is distributed over a large area. This minimizes frictional wear between the pivot pins and the jaws of the coupling members.

A primary source of frictional losses in universal joints results from a bending of the pivot pins under stress. Obviously, any bending of the pivot pins will drastically reduce the contact area between these pins and the jaws which pivot on the pins and correspondingly increase the frictional wear. In the present construction, two important factors cooperate to minimize the opportunity for bending of the pivot pins. First, there is the built-in tension in the threaded studs, the magnitude of which far exceeds the tipping or bending forces to which the pivot pins will be subjected in operation. Second, there is the close proximity of the jaws 14 to the bearing block 16 allowed by the present construction. This close proximity minimizes the bending moments applied to the pivot pins.

Another important advantage of the present construction is its enhanced fatigue resistance. The primary load supporting member is the tensioned stud 24 and it will be noted that this stud, while subjected to varying stresses, remains always under tension, such that fatigue is at a minimum. In the conventional universal joint construction, however, a solid pin is press-fitted into a bearing block and is, itself, the primary load supporting member. As such, the pin is periodically bent to and fro, with the result that the peripheral portions of the pin are alternately under tension then compression, a circumstance which renders the pins highly susceptible to fatigue.

As a further advantage, it will be noted that the press-fitted construction heretofore commonly used requires deep recesses to receive the pins and to support the pins against tipping. With pins of the diameter illustrated in a bearing block of the size illustrated, the portion of the pins actually recessed into the bearing block would have an unfavorable length to diameter ratio, with the result that the pins could not be effectively secured against tipping and would have a tendency to roll out of their recesses. Also, the amount of metal that would have to be removed from the bearing block would significantly weaken the block. The present construction overcomes these problems in securing the pins against tipping and, at the same time, allows for a bearing block which has not been significantly weakened by the formation of large, deep recesses therein.

FIGURE 4 illustrates a modification, wherein opposed coupling members 50 and 51 are joined to an intermediate bearing block 58. For connection of the coupling members to the bearing block, each of the coupling members is provided with spaced jaws 52, having apertures 54 passing therethrough. As with the preferred embodiment, the wall surfaces 56 surrounding these apertures may be case hardened.

In the present modification, each of four faces surrounding the bearing block 58 is provided with a centrally disposed shallow recess 60 which is concentric to a centrally disposed threaded bore 59 penetrating the bearing block normal to the face thereof. The recess 60 is dimensioned to snugly receive a cylindrical boss 61 formed on the inner end of a pivot pin 62 which is adapted to be fastened to the face of the bearing block. It will be noted that this construction is a type of reversal from the type of construction of the preferred embodiment wherein the entire inner end of the pivot pin is seated in a cylindrical recess 26 in the bearing block.

The design of the present modification contemplates that the pivot pin 62 will bottom against the bearing block, as opposed to the preferred embodiment, wherein the pivot pin 20 bottomed against the base of the recess 26 in the bearing block. Since, with this construction the area of contact is necessarily a substantial distance from the axis of the retaining stud, there is no need for a countersink, as employed at 34 in the preferred embodiment.

The pivot pin 62 is restrained against translation relative to the bearing block by virtue of the snug fit between the boss 61 and the recess 60 in the bearing block. The pivot pin is also secured against rotational movement relative to the bearing block by means of a pin 66 located in the base of the recess 60, which seats in a radially disposed slot 68, traversing the boss 61 from one margin thereof toward the center thereof.

The present modification illustrates that, despite the use of a large diameter pivot pin, as shown, sufficient space remains for the inclusion of needle bearings between the periphery of the pivot pin 62 and the surrounding wall of the aperture 54 in the jaw 52.

As in the preferred embodiment, the pivot pins 62 of the present modification are fastened in position by flat headed threaded studs 72, the outer end of the pivot pins 62 being countersunk to receive the heads of the threaded studs. For retention of the needle bearings in position, the countersink 69 is somewhat enlarged, to enable interposition of a washer element 70 between the head of the threaded stud and the outer end of the pivot pin 62. As illustrated, the washer element 70 has a conical central portion matching the countersink in the end of the pivot pin 62 and a planar periphery adapted to fit within the aperture 54 of the jaw 52, so as to overlie the ends of the needle bearings 64 and thereby confine the needle bearings. For securing the threaded stud 72 against counter rotation, the flat head of the stud is staked at diametrically disposed marginal positions to force portions of the washer element 70 into diametrically disposed slots 76 formed in the end of the pivot pin 62 and simultaneously produce an interference fit between the head of the stud 72 and the intermediate washer element 70.

The advantages of the present construction are believed apparent, in view of the discussion of the advantages appertaining to the construction of the preferred embodiment. Particularly, it is worthy of note that the construction of the present modification includes the use of a large diameter securely mounted pivot pin 62 and, at the same time, includes needle bearings between the jaws of the coupling members and the pivot pins, these two features cooperating to materially reduce frictional wear, without any sacrifice in the structural strengh of the resulting joint.

FIGURE 5 illustrates a second modification of the present invention, wherein a modified means is employed to secure the pivot pins of the universal joint against rotational and translational movement on the bearing block. In this modification, coupling members 80 and 82, having jaws 84 equipped with apertures 86, are pivotally secured to a bearing block 88 by means of tubular pivot pins 90. For attaching the pivot pins to the bearing block, the faces of the bearing block to which the pivot pins are to be secured are each provided with a shallow recess 92 concentric to a threaded bore for receiving a threaded stud 94 used in anchoring one of the pivot pins to the bearing block.

The base of the recess 92 is provided with a plurality of circumferentially disposed, radially divergent teeth or ridges 96, best illustrated in FIGURE 7. These teeth are adapted to interfit with complementary teeth 98 formed on the inner end of the pivot pin 90 to secure the pivot pin against both rotational and translational movement relative to the bearing block 88. In the design of this modification, the pivot pin 90, subject to a built-in stress in the threaded stud 94, bottoms against the teeth 96, which, in cooperation with the teeth 98, center the pivot pin relative to the threaded bore in the bearing block 88.

As with the previous embodiments, the stud 94 is provided with a flat head which is received in a countersunk recess in the outer end of the pivot pin 90. Also, as was the case with the previous embodiments, counter rotation of the stud 94 is prevented by means of an interference fit established by staking portions of the flat head into radially disposed slots 100 formed in the outer end of the pivot pin.

As with the previous embodiments discussed, the present embodiment offers the advantage of the comparatively large rigidly secured pivot pin in a construction which minimizes frictional losses in the operation of the universal joint.

FIGURES 6 and 8 discloses a third modification of the present invention, wherein coupling members 110 and 112, each having spaced jaws 114 apertured at 116, are pivotally joined to a bearing block 118 through the medium of pivot pins 120. The construction of this embodiment is similar to that of the modification of FIGURE 5, except that in the present embodiment the pivot pin 120 is caused to bottom against the bearing block 118, thereby relieving the axial load on the radially divergent teeth 122 and 124 which secure the pivot pin 120 against rotational motion relative to the bearing block.

To establish this feature, each of the four faces of the bearing block which receive pivot pins is provided with a shallow circular recess 128 surrounding a well 126 wherein the divergent teeth 122 are disposed. The diameter of the recess is only slightly smaller than the diameter of the pivot pin 120, so as to establish a close fit which prevents translational movement of the pivot pin relative to the bearing block. Complementary teeth 124 on the inner end of the pivot pin 120 are elevated from the end face of the pivot pin, the dimensional construction being such that the end face of the pivot pin bottoms against the base of the recess 128 before the teeth 124 have seated fully against the teeth 122 of the bearing block 118.

As in the previous embodiments the pivot pin 120 is firmly secured to the bearing block by means of a prestressed threaded stud 130 passing axially through the pivot pin. The tension developed in the stud 130 is utilized to force the teeth 122 and 124 into substantial engagement, thereby minimizing rotational movement of the pivot pin 120 relative to the bearing block 118. Also, as was the case with the previous embodiments, the threaded stud 130 is in the form of a flat head screw countersunk into the outer end of the pivot pin 120 and secured against counter rotation by an interference fit established by staking portions of the flat head into radially disposed slots 132 in the outer end of the pivot pin 120.

The construction of the embodiment of FIGURES 6 and 8 offers the advantage that the pivot pin 120 bottoms directly against the bearing block 118, thereby relieving the teeth 122 and 124 of axial pressure. Also, in the embodiment of FIGURE 5, the establishment of an accurate fit between the pivot pins 90 and the apertures 86 in the jaws of the coupling members required formation of the teeth 96 and 98 with a high degree of precision, not required in the present modification.

FIGURE 9 illustrates a construction analogous to that of FIGURE 1, including a modified means to secure the pivot pin against rotation relative to the bearing block. In the construction, a modified pivot pin 20a is seated in recess 26a in a bearing block 16a and secured under axial tension by a stud 24a threadedly engaging in the bearing block. As in the preferred embodiment of FIGURE 1, the stud is secured against counter rotation relative to the pivot pin by staking portions of the head for the stud into slots 40a formed at diametrically opposed positions in a countersink in the pivot pin 20a.

For securing the pivot pin 20a against rotation relative to the bearing block, an inclined slot 32a is milled in the outer periphery of the pivot pin 20a adjacent the base thereof and a complementary tongue 30a is swaged into the side wall of the recess 26a, whereby upon assembly of the pivot pin in the recess, the tongue 30a engages in the slot 32a, providing an interference fit which prevents rotation of the pivot pin 20a in the recess 26a.

It can be noted in FIGURE 9 that the recess 26a is annular and surrounds a central frustum-conical portion 27, the side wall of which is substantially parallel to a countersink 34a in the pivot pin. The portion 27 offers the benefit of an increased number of threads retaining the stud 24a without interfering in any way with the assembly of the universal joint.

Although the preferred embodiments of the device have been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. In a device of the class described, a pinning assembly comprising a bearing block having a bore passing into one face thereof, a pivot pin positioned adjacent said one face and aligned axially with said bore, said pivot pin having a diameter exceeding the diameter of said bore and contacting an area of said bearing block adjacent said bore, a stud disposed axially in said bore and having helically threaded engagement with said bearing block in said bore, first means engaging said stud with said pivot pin and by interference lock preventing axial separation of said stud and pivot pin, said stud being in axial tension between its threaded engagement with said block and said first means whereby said pivot pin is held in compressive engagement with said area of said bearing block, said tension being of a magnitude to prevent reversal of stresses in said pivot pin, second means interengaging said stud and pivot pin and by interference lock preventing rotation of said pivot pin in at least one direction relative to said stud, and third means interengaging said pivot pin and said bearing block and by interference lock preventing rotation of said pivot pin in said one direction relative to said bearing block, said second and third means cooperating to prevent rotation of said stud relative to said bearing block in a direction to release the axial tension in said stud.

2. In a device of the class described, the pinning assembly of claim 1 wherein said one face of said bearing block has a recess therein surrounding said bore, said bearing block having a portion fitting within said recess to restrain translational movement of said pivot pin on said one face of said bearing block.

3. In a device of the class described the pinning assembly of claim 1 wherein said one face of said bearing block has a recess therein surrounding said bore and wherein said third means interengaging said pivot pin and said bearing block comprises a plurality of teeth fixed to said bearing block and disposed in said recess below the plane of said one face, said teeth extending radially with respect to the axis of said bore and being spaced circumferentially about said bore, said pivot pin having means thereon interfitting said teeth so as to restrain rotation of said pivot pin relative to said bearing block about the axis of said bore.

4. In a device of the class described the pinning assembly of claim 1 wherein said one face of said bearing block has a recess therein surrounding said bore and said area of said bearing block is disposed on said one face adjacent said recess, and wherein said third means interengaging said pivot pin and said bearing block comprises a plurality of teeth fixed to said bearing block and disposed in said recess below the plane of said one face, said teeth being disposed radially with respect to the axis of said bore and being spaced circumferentially about said bore, said pivot pin having means interfitting said teeth to restrain rotation of said pivot pin relative to said bearing block about the axis of said bore.

5. In a device of the class described the pinning assembly of claim 1 wherein said pivot pin is a tubular pin having a cavity coaxial with said bore, said stud having a portion projecting axially through said cavity, and wherein said first means engaging said stud with said pivot pin comprises an enlarged head on said stud contacting the end of said pivot pin distal from said one face of said bearing block, said second means interengaging said stud and pivot pin comprising a recess in the end of said pivot pin adjacent said enlarged head and a projection of said enlarged head seated in said recess.

6. In a device of the class described, the pinning assembly of claim 1 wherein one of said pivot pin and said bearing block is recessed axially away from the area of contact therebetween and in surrounding relation to said bore whereby said pivot pin bottoms against said bearing block in radially spaced relation to the axis of said bore.

7. In a device of the class described, the pinning assembly of claim 1 wherein one of said pivot pin and bearing block has an axially penetrating slot adjacent the area of contact therebetween and wherein said second means comprises a projection fixed to the other of said pivot pin and bearing block seated in said slot to prevent rotation between said pivot pin and said bearing block.

8. In a device of the class described, the pinning assembly of claim 1 wherein the tension in said stud approaches closely but does not reach the yield strength of the material comprising the stud.

9. In a device of the class described, a pinning assembly comprising a bearing block having a bore passing normally into one face thereof, a tubular pivot pin positioned adjacent said one face and aligned coaxially with said bore, said pivot pin having a diameter exceeding the diameter of said bore and contacting an area of said bearing block adjacent said bore, a stud disposed axially within said pivot pin and projecting into said bore, said stud having an enlarged head contacting the end of said pivot pin distal from said one face and having helically threaded engagement with said bearing block in said bore, said helically threaded engagement cooperating with said enlarged head to maintain a tension along the length of said stud which draws said pivot pin against said area of contact with said bearing block, said tension being of a magnitude approaching, but less than the yield point of the material comprising said stud, first means having an interference fit between said pivot pin and said stud to prevent rotation of said pivot pin in at least one direction relative to said stud, and second means having an interference fit between said pivot pin and said bearing block preventing rotation of said pivot pin in said one direction relative to said bearing block, said first and second means cooperating to prevent rotation of said stud relative to said bearing block in a direction to release the tension in said stud.

References Cited by the Examiner

UNITED STATES PATENTS

| | | | |
|---|---|---|---|
| 698,159 | 4/02 | Vanderbeek | 64—17 |
| 840,529 | 1/07 | Turpin et al. | 64—17 |
| 1,407,299 | 2/22 | Robertson | 64—7 |
| 2,662,381 | 12/53 | Wildhaber | 64—21 |

FRANK SUSKO, *Primary Examiner.*

ROBERT C. RIORDON, *Examiner.*